(12) United States Patent
Gkoulalas-Divanis et al.

(10) Patent No.: US 11,456,996 B2
(45) Date of Patent: Sep. 27, 2022

(54) ATTRIBUTE-BASED QUASI-IDENTIFIER DISCOVERY

(71) Applicant: International Business Machines Corporation, Armonk, NY (US)

(72) Inventors: Aris Gkoulalas-Divanis, Waltham, MA (US); Rohit Ranchal, Austin, TX (US); Paul R. Bastide, Ashland, MA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 16/708,497

(22) Filed: Dec. 10, 2019

(65) Prior Publication Data

US 2021/0176215 A1   Jun. 10, 2021

(51) Int. Cl.
*H04L 9/40* (2022.01)
*G06F 16/9035* (2019.01)

(52) U.S. Cl.
CPC ...... *H04L 63/0421* (2013.01); *G06F 16/9035* (2019.01); *H04L 63/20* (2013.01)

(58) Field of Classification Search
CPC . H04L 63/0421; H04L 63/20; G06F 16/9035; G06F 21/6245; G06F 16/907
See application file for complete search history.

(56) References Cited

U.S. PATENT DOCUMENTS

| | | | |
|---|---|---|---|
| 8,812,524 | B2 | 8/2014 | Chen et al. |
| 9,934,239 | B2 | 4/2018 | Gkoulalas-Divanis et al. |
| 10,095,883 | B2 | 10/2018 | Intonates et al. |
| 2010/0162402 | A1* | 6/2010 | Rachlin ............ G06F 21/60 726/26 |
| 2011/0119661 | A1* | 5/2011 | Agrawal ........... G06F 21/566 717/154 |
| 2012/0036135 | A1* | 2/2012 | Fu .................... G06F 21/6254 707/E17.075 |

(Continued)

FOREIGN PATENT DOCUMENTS

CN   109543445 A   3/2019

OTHER PUBLICATIONS

Sudhakar et al., "Index based quasi-identifier approach for privacy preservation data sets on cloud", Oct. 2016, International Conference on Signal Processing, Communication, Power and Embedded System, pp. 1562-1566 (Year: 2016).*

(Continued)

*Primary Examiner* — Kenneth W Chang
(74) *Attorney, Agent, or Firm* — Timothy J. Singleton

(57) ABSTRACT

A method, system, and computer program product for privacy protection of records based on attribute-based determination of quasi-identifiers within the records is provided. The method receives a first set of records containing a first set of attributes for a set of individuals. The method receives a second set of records for the set of individuals, with the second set of records containing a second set of attributes. A first set of quasi-identifiers, based on the first set of attributes, is accessed for the first set of records. The method determines a set of new attributes of the second set of attributes based on the first set of attributes. A second set of quasi-identifiers is generated based on the first set of quasi-identifiers and the set of new attributes. The method generates an anonymized set of records from the second set of records based on the second set of quasi-identifiers.

20 Claims, 6 Drawing Sheets

(56) References Cited

U.S. PATENT DOCUMENTS

| | | |
|---|---|---|
| 2013/0291128 A1 | 10/2013 | Ito et al. |
| 2014/0096261 A1 | 4/2014 | Boldyrev et al. |
| 2014/0189858 A1* | 7/2014 | Chen ................ G06F 16/21 726/22 |
| 2015/0169895 A1* | 6/2015 | Gkoulalas-Divanis ............... G06F 21/6227 726/26 |
| 2016/0117526 A1* | 4/2016 | Takahashi .......... G06F 21/6254 726/26 |
| 2016/0342636 A1* | 11/2016 | Braghin ............... G06F 9/5055 |
| 2018/0232488 A1* | 8/2018 | Jafer .................. G06F 21/6254 |
| 2019/0188292 A1 | 6/2019 | Gkoulalas-Divanis |
| 2019/0188416 A1 | 6/2019 | Gkoulalas-Divanis |

OTHER PUBLICATIONS

Pei et al., "Privacy Preserving Publishing on Multiple Quasi-identifiers", Mar. 2009, IEEE 25th International Conference on Data Engineering, pp. 1132-1135 (Year: 2009).*

* cited by examiner

ATTRIBUTE-BASED QUASI-IDENTIFIER DISCOVERY

BACKGROUND

Data security systems often attempt to sanitize public facing data deemed to be identifying. Some of these data security systems consider triangulation attacks with external datasets and use syntactic approaches to protect potentially identifying information within datasets. Syntactic approaches to data anonymization often rely on a priori, formal specification of an attacker's background knowledge. These syntactic approaches may additionally rely on identifying directly identifying information to offer privacy protection. Such approaches dictate data transformations to be applied to person specific datasets in order to offer user privacy.

SUMMARY

According to an embodiment described herein, a computer-implemented method for privacy protection of records based on attribute-based determination of quasi-identifiers within the records, is provided. The method receives a first set of records containing a first set of attributes for a set of individuals. The method receives a second set of records for the set of individuals, with the second set of records containing a second set of attributes. A first set of quasi-identifiers is accessed for the first set of records. The first set of quasi-identifiers is based on the first set of attributes. The method determines a set of new attributes of the second set of attributes based on the first set of attributes. A second set of quasi-identifiers is generated based on the first set of quasi-identifiers and the set of new attributes. The method generates an anonymized set of records from the second set of records based on the second set of quasi-identifiers.

According to an embodiment described herein, a system for privacy protection of records based on attribute-based determination of quasi-identifiers within the records is provided. The system includes one or more processors and a computer-readable storage medium, coupled to the one or more processors, storing program instructions that, when executed by the one or more processors, cause the one or more processors to perform operations. The operations receive a first set of records containing a first set of attributes for a set of individuals. The operations receive a second set of records for the set of individuals, with the second set of records containing a second set of attributes. A first set of quasi-identifiers is accessed for the first set of records. The first set of quasi-identifiers is based on the first set of attributes. The operations determine a set of new attributes of the second set of attributes based on the first set of attributes. A second set of quasi-identifiers is generated based on the first set of quasi-identifiers and the set of new attributes. The operations generate an anonymized set of records from the second set of records based on the second set of quasi-identifiers.

According to an embodiment described herein a computer program product for privacy protection of records based on attribute-based determination of quasi-identifiers within the records is provided. The computer program product includes a computer readable storage medium having program instructions embodied therewith, the program instructions being executable by one or more processors to cause the one or more processors to receive a first set of records containing a first set of attributes for a set of individuals. The computer program product receives a second set of records for the set of individuals, with the second set of records containing a second set of attributes. A first set of quasi-identifiers is accessed for the first set of records. The first set of quasi-identifiers is based on the first set of attributes. The computer program product determines a set of new attributes of the second set of attributes based on the first set of attributes. A second set of quasi-identifiers is generated based on the first set of quasi-identifiers and the set of new attributes. The computer program product generates an anonymized set of records from the second set of records based on the second set of quasi-identifiers.

DETAILED DESCRIPTION

Figure 1:
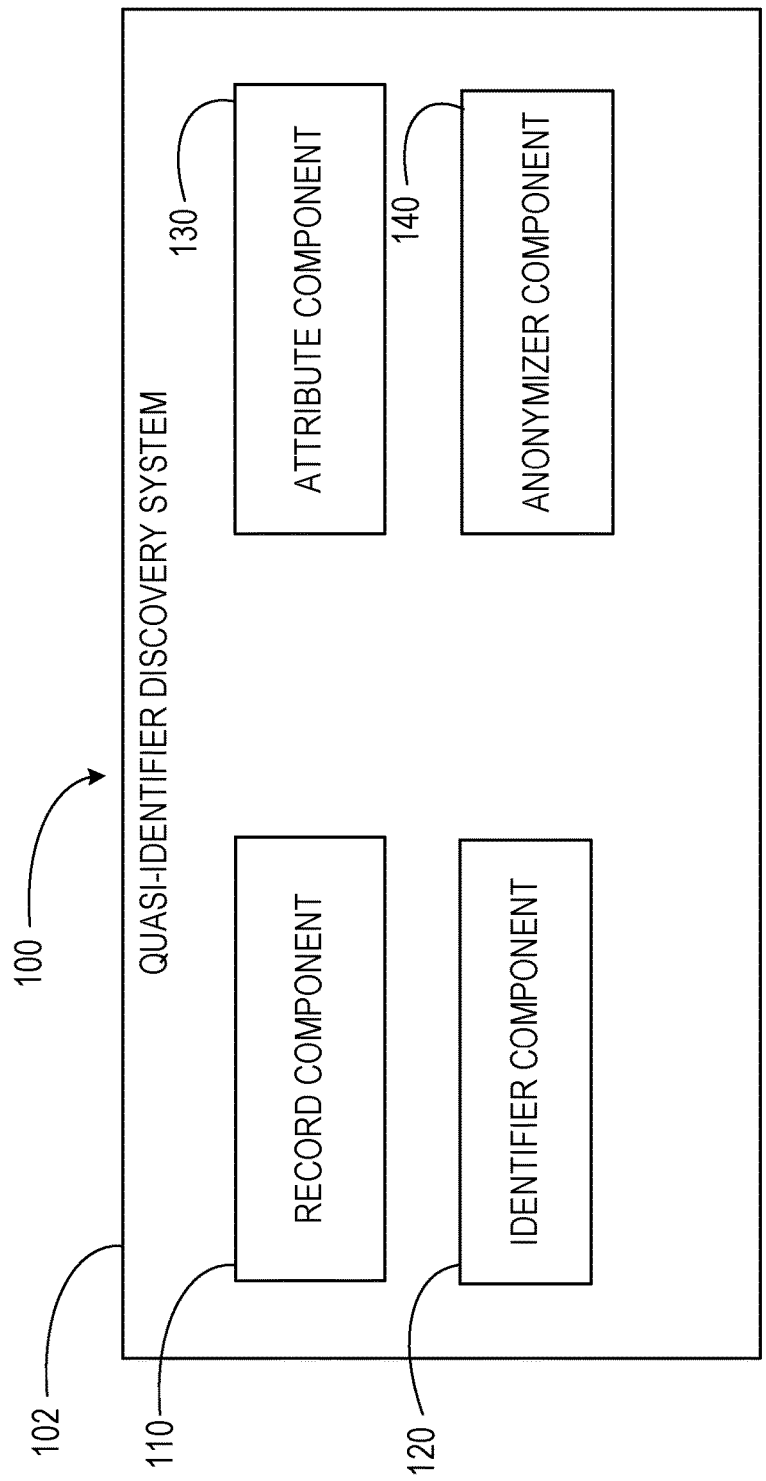
FIG. 1 depicts a block diagram of a computing environment for implementing concepts and computer-based methods, according to at least one embodiment.

The present disclosure relates generally to methods for privacy protection for users of public facing data. More particularly, but not exclusively, embodiments of the present disclosure relate to a computer-implemented method for attribute-based determination of identifying information within records and anonymization of such identifying information. The present disclosure relates further to a related system for privacy protection of records based on attribute-based determination of quasi-identifiers within records sets, and a computer program product for operating such a system.

Syntactic approaches to data anonymization often use formal specification of an attacker's knowledge, dictating data transformations to be applied to data for a specific individual in order to offer user privacy. This background knowledge may be provided by privacy experts, based on their knowledge of the area and information that is publicly available, or may be derived from datasets. Syntactic approaches aiming to block re-identification attacks may represent the background knowledge as quasi (or indirect) identifiers. Information within a dataset may be directly identifying or may be used in combination with other data to identify individuals. Direct identifiers may be understood as attributes whose values can be used alone to re-identify an individual of the set of individuals. The value of a direct identifier may uniquely correspond to a person. Data may also be used in combination with other data in order to re-identify individuals. Quasi-identifiers are data attributes whose values alone are not identifying for individuals of the set of individuals. However, quasi-identifiers are data attributes with values which, when used in combination, can lead to successful re-identification of individuals. Quasi-identifiers may also be considered as data attributes with values which, when used in combination, can lead to successful identification of a suitably small set or group of individuals.

Some previous systems operate on static data releases, where an entire dataset is available to be scanned and subsequently protected. In these instances, discovered identifiers may not change over time. However, such systems often encounter difficulties in protecting user data with dynamic data releases including new or modified records. Some systems consider such dynamic data releases by representing new or modified records under the same schema as data in an original dataset. However, the static and dynamic systems fail to consider data releases in which new attributes become available, whether in new records or as modifications to older records or schema. Instances where new attributes become available may include data ingestion into a platform. Such ingestion operations, over time, incorporate additional information, which may become available for each record ingested to a platform. The additional information, recorded as new attributes, lead to significant changes in identifying information, such as direct identifiers and quasi-identifiers.

Since quasi-identifiers may be used to re-identify individuals, systems which fail to account for such information may leave individual data vulnerable to attack. Embodiments of the present disclosure describe systems, methods, and computer program products capable of computationally identifying direct identifiers and quasi-identifiers. These embodiments enable discovery of data or attributes acting as unique or rare value combinations within sets of attributes that may be used as quasi-identifiers. Embodiments of the present disclosure enable data protection and anonymization in real-time or near real-time systems. These embodiments determine and report significant changes to direct identifiers and quasi-identifiers occurring due to incorporation of additional attributes in data records in real-time. Embodiments of the present disclosure also enable anonymization algorithms to adapt processing of data to protect individuals from new privacy threats with real-time data acquisition and addition.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a quasi-identifier discovery system 102. The quasi-identifier discovery system 102 may comprise a record component 110, an identifier component 120, an attribute component 130, and an anonymizer component 140. The record component 110 receives and accesses sets of records relating to sets of individuals and attributes and values contained within those records. The identifier component 120 accesses, generates, and modifies sets of quasi-identifiers for individuals represented by sets of records. The attribute component 130 determines and organizes attributes of the sets of records. The anonymizer component 140 generates anonymized sets of records using generated and modified quasi-identifiers. Although described with distinct components, it should be understood that, in at least some embodiments, components may be combined or divided, or additional components may be added, without departing from the scope of the present disclosure.

Figure 2:
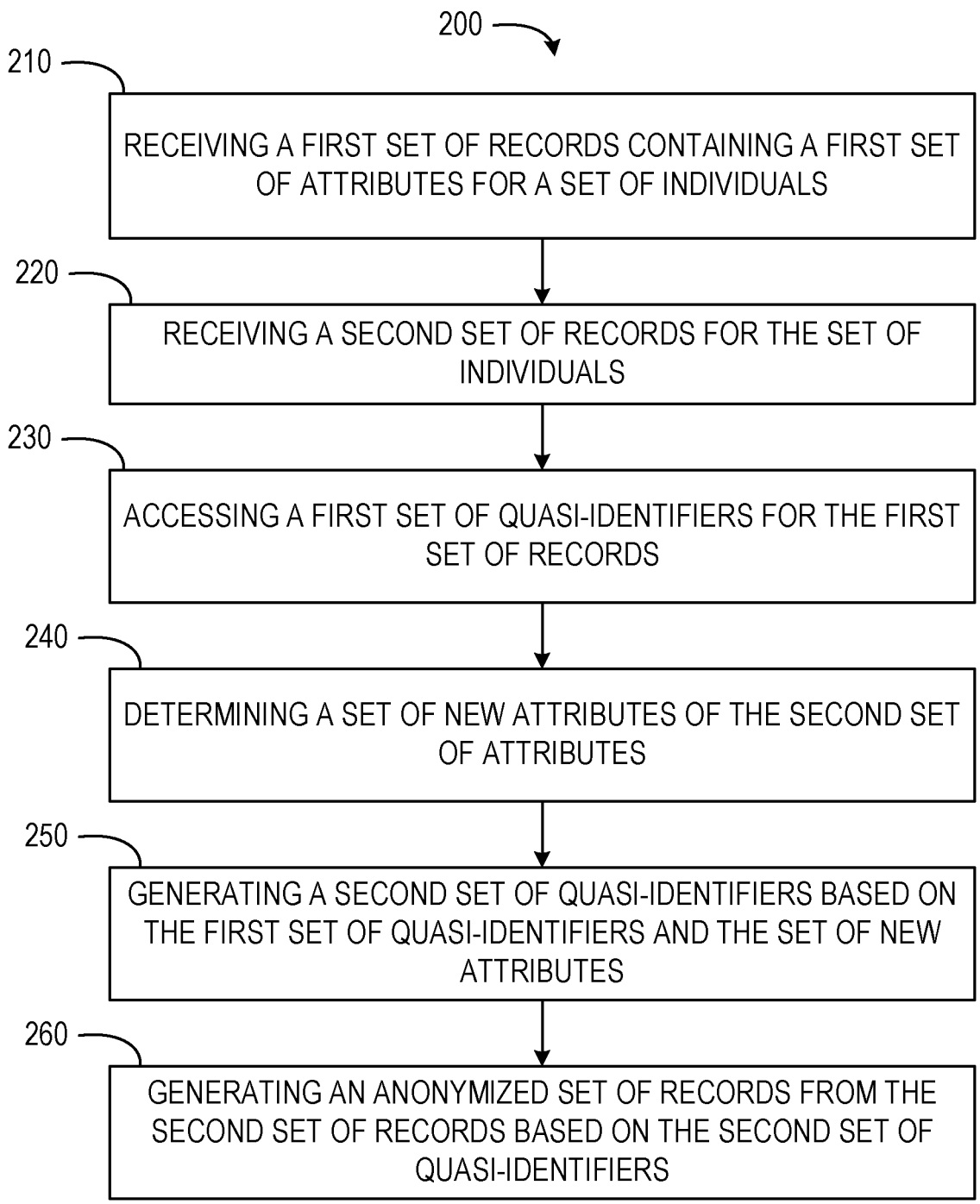
FIG. 2 depicts a flow diagram of a computer-implemented method for privacy protection of records based on attribute-based determination of quasi-identifiers within the records, according to at least one embodiment.

Referring now to FIG. 2, a flow diagram of a computer-implemented method 200 is shown. The computer-implemented method 200 is a method for privacy protection of records based on determination of attribute-based quasi-identifiers within the records. In some embodiments, the computer-implemented method 200 may be performed by one or more components of the computing environment 100, as described in more detail below.

At operation 210, the record component 110 receives a first set of records. In some embodiments, the first set of records contains a first set of attributes for a set of individuals. Each record corresponds to at least one individual of the set of individuals. The first set of records may be received and stored within a relational database, data tables, or any other suitable data structure. In some embodiments, the first set of records is received in real-time or near real-time. In some instances, the first set of records is a set of records received at a previous point in time. In such instances, the first set of records may be used, at least in part, to generate a relational dataset for the set of individuals. The first set of records may also be used to determine direct identifiers and quasi-identifiers for the set of individuals.

The first set of records may be a set of records in a relational dataset D. The relational dataset D consists of R records, of which the first set of records is a subset. The first set of attributes, of the first set of records, may be represented as $A=\{A_1, \ldots, A_n\}$. In some instances, the first set of attributes is associated with a known set of quasi-identifying attributes $Q \subseteq A$. In some embodiments, upon receiving the first set of records with the first set of attributes, the components of the quasi-identifier discovery system 102 determine or generate a set of quasi-identifiers for the first set of records. Determining or generating the set of quasi-identifiers for the first set of records may be performed similar to or the same as described below with respect to operations 240 and 250 and the method 300.

By way of example, the first set of records may be understood as a first relational dataset, shown in Table 1. The first relational dataset includes original attributes $A=\{A_1, A_2, A_3\}$. Attributes and associated values of the first relational data set are known. The first relational dataset may be received by the record component 110 at the beginning of operation 210. In some instances, the first relational dataset is previously stored within a database and made available to the record component 110 at the beginning of operation 210.

TABLE 1

| $A_1$ | $A_2$ | $A_3$ |
|---|---|---|
| 1 | 0 | 3 |
| 1 | 0 | 2 |
| 0 | 6 | 3 |
| 0 | 6 | 4 |
| 0 | 1 | 4 |
| 1 | 5 | 2 |
| 1 | 5 | 2 |
| 0 | 1 | 4 |

TABLE 2

| $A_1$ | $A_2$ | $A_3$ | $B_1$ | $B_2$ | $B_3$ |
|---|---|---|---|---|---|
| 1 | 0 | 3 | 1 | 3 | 7 |
| 1 | 0 | 2 | 1 | 3 | 8 |
| 0 | 6 | 3 | 1 | 4 | 7 |
| 0 | 6 | 4 | 1 | 4 | 8 |
| 0 | 1 | 4 | 2 | 5 | 9 |
| 1 | 5 | 2 | 2 | 5 | 9 |
| 1 | 5 | 2 | 2 | 6 | 9 |
| 0 | 1 | 4 | 2 | 6 | 9 |

In the example above, the first set of attributes of the first set of records may be associated with a histogram of attributes. The histogram may be represented as a grouping of values and frequencies for each attribute. For example, the histogram for the attributes A may be expressed in Table 1.1-1.3.

TABLE 1.1

| Value | 0 | 1 |
|---|---|---|
| Frequency | 4 | 4 |

TABLE 1.2

| $A_2$: | | | | |
|---|---|---|---|---|
| Value | 0 | 1 | 5 | 6 |
| Frequency | 2 | 2 | 2 | 2 |

TABLE 1.3

| $A_3$: | | | |
|---|---|---|---|
| Value | 2 | 3 | 4 |
| Frequency | 3 | 2 | 3 |

At operation 220, the record component 110 receives a second set of records for the set of individuals. In some embodiments, the second set of records contains a second set of attributes. The second set of records may be received and stored within a relational database, data tables, or any other suitable data structure. The second set of records may be received in real-time or near-real time. For example, the second set of records may be received as a set of transactions to which individuals of the set of individuals are a party. The second set of records may also include a set of operations, queries, or any other suitable and relevant records associated with the set of individuals. With respect to the example representations of the first set of records, the second set of records may be a set of records stored in the relational dataset D. In some embodiments, the second set of attributes, of the second set of records, is represented as $B=\{B_1, \ldots, B_n\}$.

By way of further example, the second set of records may be a second relational dataset, shown in Table 2. The second relational dataset may augment the first relational dataset as long as the second set of records involve the same individuals as the first set of records. As shown, the second relational dataset adds new attributes $B=\{B_1, B_2, B_3\}$ to the first set of records. The second set of records, in this example, may be received or accessed at a time subsequent to receiving or accessing the first set of records.

At operation 230, the identifier component 120 accesses a first set of quasi-identifiers for the first set of records. The first set of quasi-identifiers are based on the first set of attributes. Quasi-identifiers are data attributes whose values alone are not identifying for individuals of the set of individuals. However, quasi-identifiers are data attributes with values which, when used in combination, can lead to successful re-identification of individuals. In some embodiments, quasi-identifiers also include data attributes with values which, when used in combination, lead to successful re-identification or narrowing of a group or set of individuals. For example, attribute combinations identifying a suitably small percentage (e.g., 3-5%) of individuals may be quasi-identifiers. Quasi-identifiers, when in combinations, can be used in attacks on privacy of individuals. When used or taken together, the combination of values of quasi identifying attributes can be unique, or suitably rare, for individuals. Therefore, quasi-identifiers may allow for linkage of a person's record in a dataset with a record in an external, publicly available data set that reveals the name of that person. Such an external dataset may be a dataset such as a voter registration list, decennial records, census records, combinations thereof, or any other suitable and relevant datasets. An example of quasi-identifying attributes is the combination of date-of-birth, gender, and 5-digit zip code, which has been found to be unique for a relatively large portion of the United States population.

In the example of Tables 1 and 2, the first set of records may have a known set of quasi-identifiers (e.g., the first set of quasi-identifiers). Since the first set of quasi-identifiers are known, the identifier component 120 may access the first set of quasi-identifiers after receiving the second set of records. In some instances, the components of the quasi-identifier discovery system 102 initially generate or determine the first set of quasi-identifiers upon receiving or initially being provided access to the first set of records. In the example of Tables 1 and 2, the first set of quasi-identifiers may be represented as $Q=\{A_1A_3, A_2A_3\}$.

At operation 240, the attribute component 130 determines a set of new attributes of the second set of attributes. In some embodiments, the set of new attributes is determined based on the first set of attributes. The set of new attributes may be determined by eliminating a portion of the second set of attributes with predetermined values, value frequencies, or ubiquity, as discussed below in some embodiments. Once a portion of the second set of attributes are eliminated, the attribute component 130 may compare remaining attributes of the second set of attributes to the first set of attributes to determine the set of new attributes. In some embodiments, the attribute component 130 compares the remaining attributes to the first set of attributes based on one or more characteristics of the attributes, such as frequency of occurrence, type of attribute, or other suitable and relevant characteristics. For example, discussion of use of value frequencies for attributes is described below with respect to method 300.

In some embodiments, the attribute component 130 determines the set of new attributes by identifying one or more direct indicators within the second set of attributes. The direct indicators or direct identifiers are data attributes which may be included in the first set of records or the second set of records. The direct identifiers may be understood as attributes whose values can be used alone to re-identify an individual of the set of individuals. The value of a direct identifier may uniquely correspond to a person. Thus, when present in a dataset of the first or second set of records, the direct identifier reveals the identity of the corresponding individual. For example, direct identifiers or direct indicators may include a person's name, social security number, phone number, street address, national identifications or national identification numbers, credit card numbers, or any other suitable and relevant identifying information. By way of further example, a unique value $b_1$ for a record in the dataset D may be considered a direct identifier where a frequency of the value is one (i.e., $freq(b_1)=1$).

The attribute component 130 removes the one or more direct indicators from the second set of attributes. In some embodiments, upon determination of a direct indicator, the attribute component 130 removes the one or more direct indicator by deleting the value associated with the direct indicator from the second set of attributes. In some instances, the attribute component 130 removes the one or more direct indicators from the second set of attributes by obscuring or precluding the one or more direct indicators from being transferred from a first dataset (i.e., a private dataset) to a second dataset (i.e., a publicly accessible dataset). In such instances, attributes or values determined to be direct indicators may be retained when data of the second set of records or the second set of attributes is written to a publicly accessible dataset.

In some embodiments, the attribute component 130 determines the set of new attributes by identifying one or more ubiquitous attributes within the second set of attributes. Ubiquitous attributes may be attributes having a same value across all instances of the second set of attributes. The ubiquitous attributes may have value that are the same for each individual of the set of individuals represented by the second set of data. The attribute component 130 removes from further consideration the one or more ubiquitous attributes from the second set of attributes. The attribute component 130 may disregard the ubiquitous attributes without removing the ubiquitous attributes from the second set of data.

With respect to the example of Tables 1 and 2, the attribute component 130 determines the set of new attributes by identifying and discarding from further consideration as a potential quasi-identifier any attribute $B_i$ that has a same value across all records. It also discards from the data as well as from further consideration any attribute $B_i$ that has a unique value ($b_i$) for a record in the data set. For example, a record with a unique value may be represented by a frequency representation of $freq(b_i)=1$. Where an attribute with the above-reference characteristics is not found, the attribute component 130 may proceed with other operations for determining the set of new attributes.

At operation 250, the identifier component 120 generates a second set of quasi-identifiers. The second set of quasi-identifiers is generated based on the first set of quasi-identifiers and the set of new attributes. The identifier component 120 may generate the second set of quasi-identifiers as a new list of quasi-identifiers (Q') to a first list of quasi-identifiers (Q), organized from the first set of quasi-identifiers. In some embodiments, the identifier component 120 generates the second set of quasi-identifiers by considering all combinations of two attributes, or two values of differing attributes, from one or more of the first set of attributes and the new set of attributes. For example, the identifier component 120 may initially consider combinations of two attributes within the new set of attributes. The identifier component 120 may continue considering combinations of attributes until in a stepwise manner until all combinations of attributes within the set of new attributes and among the set of new attributes and the set of first attributes have been considered. Where a combination of attributes is determined to be identifying to an individual of the set of individuals, the combination of attributes is selected for inclusion in the second set of quasi-identifiers.

In some embodiments, once a combination of attributes or values is determined to be a quasi-identifier, the identifier component 120 precludes consideration of longer combinations including the previously identified combination of attributes or values. For example, where a combination of two attributes (e.g., $A_xB_y$) are determined to be a quasi-identifier, the identifier component 120 may not consider longer combinations of attributes (e.g., $A_xB_yC_n$) containing the previous shorter combination of attributes. In some embodiments, the identifier component 120 may add all instances of a combination of attributes to the second set of quasi-identifiers. For example, the identifier component 120 may include the attribute combination of $A_xB_y$ and all subsequent longer combinations including $A_xB_y$ as quasi-identifiers. In some embodiments, the identifier component 120 includes only the shortest combination of attributes which qualify as quasi-identifiers.

At operation 260, the anonymizer component 140 generates an anonymized set of records from the second set of records. The anonymized set of records are generated based on the second set of quasi-identifiers. In some embodiments, the anonymizer component 140 generates the anonymized set of records by removing values or attributes from the second set of records. In some instances, the anonymizer component 140 removes values associated with attribute combinations included in the second set of quasi-identifiers to generate the anonymized set of records. For example, the anonymizer component 140 may remove, delete, obfuscate, or otherwise preclude the values from being included in a publicly accessible version of the second set of records. In some embodiments, the anonymizer component 140 generates the anonymized set of records by generalizing values or attributes from the second set of records. In some instances, the anonymizer component 140 modifies values associated with attribute components included in the second set of quasi-identifiers to generate the anonymized set of records. For example, the anonymizer component 140 may summarize, broaden (e.g., partially remove), or otherwise modify values or attributes to reflect less specific information within the second set of records or in one or more attributes or values of an attribute combination serving as a quasi-identifier. By way of further example, where a quasi-identifier is determined to be an attribute combination of a gender, a date of birth, and a postal code, the anonymizer component 140 may generalize one or more values for the attribute combination, such as changing a date of birth to a birth year. Although described with respect to specified examples of data anonymization, it should be understood that the anonymizer component 140 may modify the second set of records, or attributes or values thereof, in any suitable and relevant manner to generate the anonymized set of records.

Figure 3:
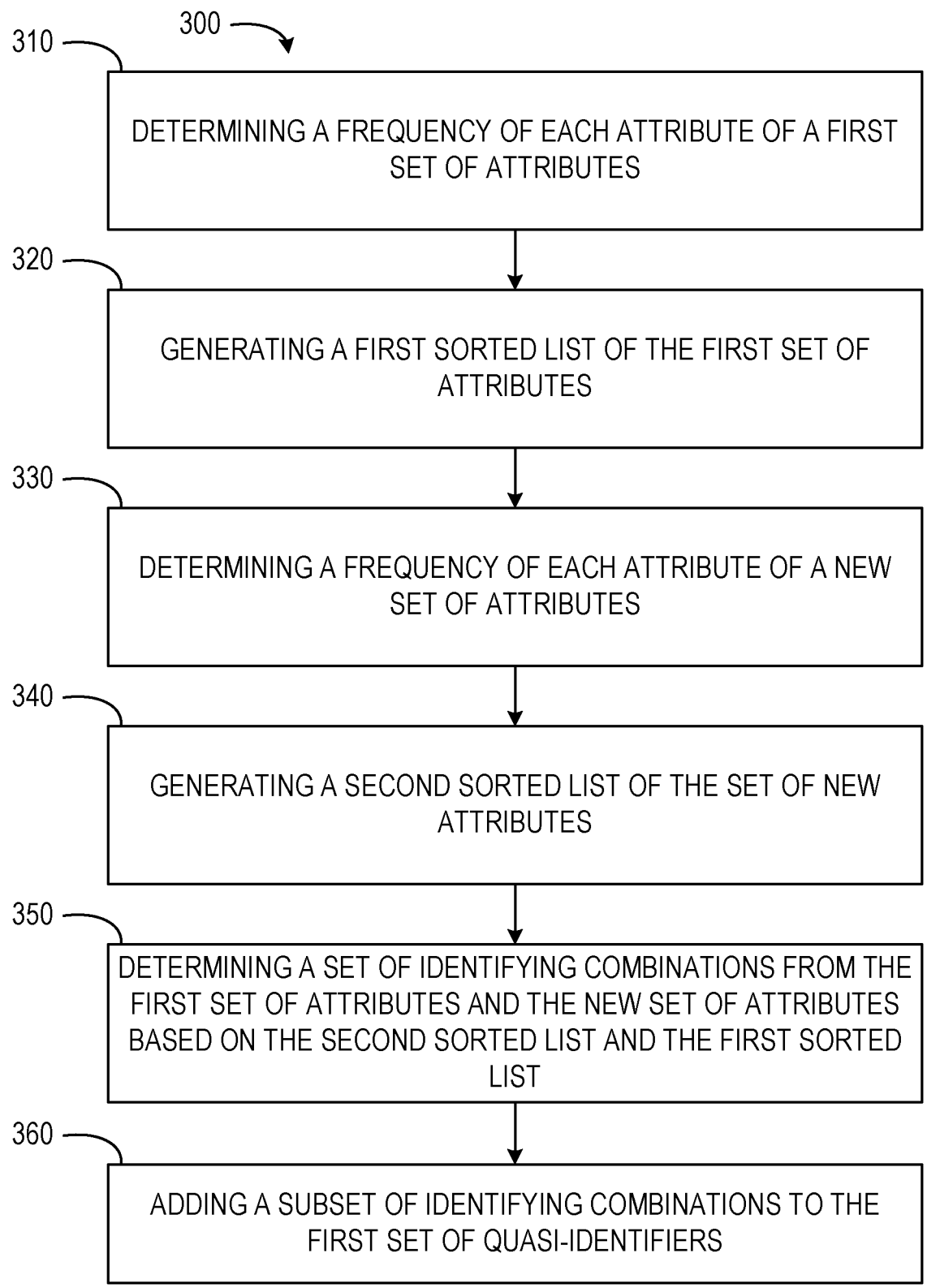
FIG. 3 depicts a flow diagram of a computer-implemented method for determination of attribute-based quasi-identifiers within record sets, according to at least one embodiment.

FIG. 3 shows a flow diagram of an embodiment of a computer-implemented method 300 for determination of attribute-based quasi-identifiers within record sets. The method 300 may be performed by or within the computing environment 100. In some embodiments, the method 300 comprises or incorporates one or more operations of the method 200. In some instances, operations of the method 300 may be incorporated as part of or sub-operations of the method 200. For example, in some embodiments, operations of the method 300 may be performed as part of one or more of operations 240 and 250 of the method 200, described above.

In operation 310, the identifier component 120 determines a frequency of each attribute of the first set of attributes. The frequency of each attribute indicates a number of times that attribute or a specified value for that attribute occurs within the first set of records or the first set of attributes. The identifier component 120 generates a first set of value frequencies from the frequency of each attribute or value associated with a specified attribute. Each value of the first set of attributes is associated with a value frequency of the first set of value frequencies. In some embodiments, the identifier component 120 and the attribute component 130 cooperate to determine value frequencies of the first set of attributes by computing the most infrequent values (at) and corresponding frequencies (freq($a_i$)). In such embodiments, the attribute component 130 may determine which values occur in the first set of attributes most infrequently. The attribute component 130 may also determine the frequencies of those determined values.

With respect to the example of Tables 1 and 2, the identifier component 120 may produce histograms for attributes in Table 1. The identifier component 120 uses the histograms to create a second sorted list for the set of new attributes. The histograms for Table 1 may be generated as described above with respect to Tables 1.1, 1.2, and 1.3.

In operation 320, the identifier component 120 generates a first sorted list of the first set of attributes. The first sorted list is generated based on the first set of value frequencies. In some embodiments, the first set of attributes are inserted into a list LA. The list LA may be sorted from lowest frequency of occurrence (e.g., the most infrequent values) to the highest frequency of occurrence (e.g., most frequent values). Thus, the first sorted list may order the first set of attributes, or values associated with the first set of attributes, based on increasing frequency of occurrence of the values. The sorted list may be ordered in decreasing order of bins for each histogram of an attribute $A_i$. With respect to the example of Tables 1 and 2, based on the histograms depicted in Tables 1.1, 1.2, and 1.3, the identifier component 120 generates the list be as $L_A: A_2^4 \rightarrow A_3^3 \rightarrow A_1^2$. In the notation for list $L_A$, the superscript denotes a number of bins in the histogram of the corresponding attribute. This number of bins may be used to define a priority order for producing combinations of attributes to check for possible quasi-identifiers.

In operation 330, the identifier component 120 determines a frequency of each attribute of the set of new attributes. The identifier component 120 generates a second set of value frequencies from the frequency of each attribute of the set of new attributes. Each attribute is associated with a value frequency of the second set of value frequencies. In some embodiments, the identifier component 120 and the attribute component 130 cooperate to determine value frequencies of the set of new attributes. The identifier component 120 and the attribute component 130 may compute the most infrequent values ($b_i$) and corresponding frequencies of those most infrequent values. In such embodiments, the attribute component 130 may determine which values occur in the set of new attributes most infrequently. The attribute component 130 may also determine the frequencies of those computed values.

With respect to the example of Tables 1 and 2, the identifier component 120 may produce histograms for attributes in Table 2. The identifier component 120 uses the histograms to create a second sorted list for the set of new attributes. The histograms for Table 2 may be generated as described below.

TABLE 2.1

| $B_1$: | | |
|---|---|---|
| Value | 1 | 2 |
| Frequency | 4 | 4 |

TABLE 2.2

| $B_2$: | | | | |
|---|---|---|---|---|
| Value | 3 | 4 | 5 | 6 |
| Frequency | 2 | 2 | 2 | 2 |

TABLE 2.3

| $B_3$: | | | |
|---|---|---|---|
| Value | 7 | 8 | 9 |
| Frequency | 2 | 2 | 4 |

In operation 340, the identifier component 120 generates a second sorted list of the set of new attributes. The second sorted list is generated based on the second set of value frequencies. The second sorted list is generated based on the second set of value frequencies. In some embodiments, the set of new attributes, or values associated therewith, are inserted into a list $L_B$. The list $L_B$ may order the values in decreasing order of number of bins for each histogram of an attribute $B_i$. In some embodiments, ordering the list from least frequently occurring values to most frequently occurring values produces the list $L_B$ in an order similar to or the same as the list $L_A$. With respect to the example of Tables 1 and 2, based on the histograms depicted in Tables 2.1, 2.2, and 2.3, the identifier component 120 generates the list be as $L_B: B_2^4 \rightarrow B_3^3 \rightarrow B_1^2$.

In operation 350, the identifier component 120 determines a set of identifying combinations from the first set of attributes and the new set of attributes based on the second sorted list and the first sorted list. In some embodiments, the identifier component 120 considers all combinations of two or more attributes from one or more of the first sorted list and the second sorted list. For example, the identifier component 120 may initially consider combinations of two attributes from a single list. In some embodiments, the identifier component 120 gives priority to values of attributes having a higher sum of number of bins in their histograms. Where the identifier component 120 determines a tie, the identifier component 120 may give priority to pairs, or other numbers of values, that occur earlier in one or more of the sorted lists.

The identifier component 120 may continue in a stepwise manner, examining larger combinations of attributes in a lattice of all attributes A∪B for cases that no subset may be found to be a quasi-identifier. The identifier component 120 may continue considering different combinations of attributes and combinations of different numbers of attributes from one or more of the first sorted list and the second sorted list until all combinations of attributes have been considered.

In some embodiments, the identifier component 120 operations in an a priori manner. The identifier component 120 may give priority to those combinations of attributes that carry a larger sum of the number of bins in their corresponding histograms. Where a tie occurs, the identifier component 120 may give priority to combinations of attributes that are produced using attributes that appear earlier in one of the sorted lists. For example, the identifier component 120 may consider an attribute combination of $A_2B_2$. The attribute combination has a histogram sum of 8. The identifier component 120 determine that the attribute combination is a quasi-identifier, since combination "1, 5" appears only once in the data of Table 2. The identifier component 120 may then consider $B_2B_3$ as a potential quasi-identifier, since the histogram sum is 7. The identifier component 120 may determine the $B_2B_3$ combination is also a quasi-identifier. The identifier component 120 may then consider an attribute combination of $A_3B_2$ as a potential quasi-identifier, given the histogram sum of 7. As before, the identifier component 120 determines the $A_3B_2$ combination is a quasi-identifier. The identifier component 120 may then examine attribute combinations of $A_2B_3$, $A_3B_3$, $B_2B_3$, $B_2B_1$, $A_1B_2$, $A_3B_1$, and $A_1B_3$ in a sequence. The identifier component 120 may determine the attribute combinations are quasi-identifiers except for the combination of $B_2B_1$.

In operation 360, the identifier component 120 adds a subset of identifying combinations to the first set of quasi-identifiers. Adding the subset of identifying combinations generates a second set of quasi-identifiers. For combinations of attributes or values determined not to be quasi-identifiers, the identifier component 120 may extract those combinations from one or more of the first sorted list and the second sorted list. For combinations of attributes or values determined to be quasi-identifiers, the identifier component 120 adds the combination to the first set of quasi-identifiers to generate the second set of quasi-identifiers. The identifier component 120 may continue adding combinations of values or attributes to the first set of quasi-identifiers until all combinations of values or attributes of the first sorted list and the second sorted list have been evaluated. Evaluation of all combinations of values or attributes represents a stop condition. Once the stop condition is reached, the identifier component 120 and the attribute component 130 may finalize the second set of quasi-identifiers and return a list of the second set of quasi-identifiers. In some embodiments, each identifying combination of the set of identifying combinations is a combination of attributes from at least one of the first set of attributes and the new set of attributes. Each identifying combination includes a number of attributes fewer than a combination threshold.

With respect to the example of attribute component $A_2B_2$, once identified as a quasi-identifier, the identifier component 120 adds the attribute combination to the second set of quasi-identifiers. In some instances, the second set of quasi-identifiers is a modified list including a list of the first set of quasi-identifiers. For example, the first set of quasi-identifiers may be a list $Q=\{A_1A_3, A_2A_3\}$. Adding the attribute component $A_2B_2$ generates the list Q', where $Q'=\{A_1A_3, A_2A_3\}\cup\{A_2B_2\}$. As in the example above, where the identifier component 120 also determines the $B_2B_3$ combination is a quasi-identifier, the identifier component 120 may add the $B_2B_3$ combination to the list Q' to generate the list $Q'=\{A_1A_3, A_2A_3, A_2B_2\}\cup\{B_2B_3\}$. Where the identifier component 120 next determines the $A_3B_2$ combination is a quasi-identifier, the identifier component 120 then updates the list Q' to be $\{A_1A_3, A_2A_3, A_2B_2, B_2B_3\}\cup\{A_3B_2\}$. After examining the sequence of attribute combinations, the identification component may update the list Q' to be $\{A_1A_3, A_2A_3, A_2B_2, B_2B_3, A_3B_2, A_2B_3, A_3B_3, B_2B_3, A_1B_2, A_3B_1, A_1B_3\}$. It should be noted that, although the attribute combinations are described as combinations of two attributes, the identifier component 120 may examine attribute combinations of any suitable length and determine those attribute combinations to qualify or not qualify as quasi-identifiers. In some embodiments, quasi-identifiers include an upper limit, such as combinations of 4-10 attributes.

In some embodiments, each quasi-identifier in list Q' can be computed using lists $L_A$ and $L_B$ that may be produced in linear time via a scan through a provided or accessed dataset (e.g., Table 2). The computation of such lists may provide relative high probability that a derived combination of attributes will be a quasi-identifier. In some instances, the identifier component 120 terminates the quasi-identifier examination process when all quasi-identifiers have been computed by operating in a level-wise or step-wise manner within a lattice of attributes. In embodiments of a real-time or near real-time environment, the identifier component 120 may perform quasi-identifier identification as soon as new datasets are received. Further, the identifier component 120 may perform anonymization operations immediately upon identifying quasi-identifiers.

Figure 4:
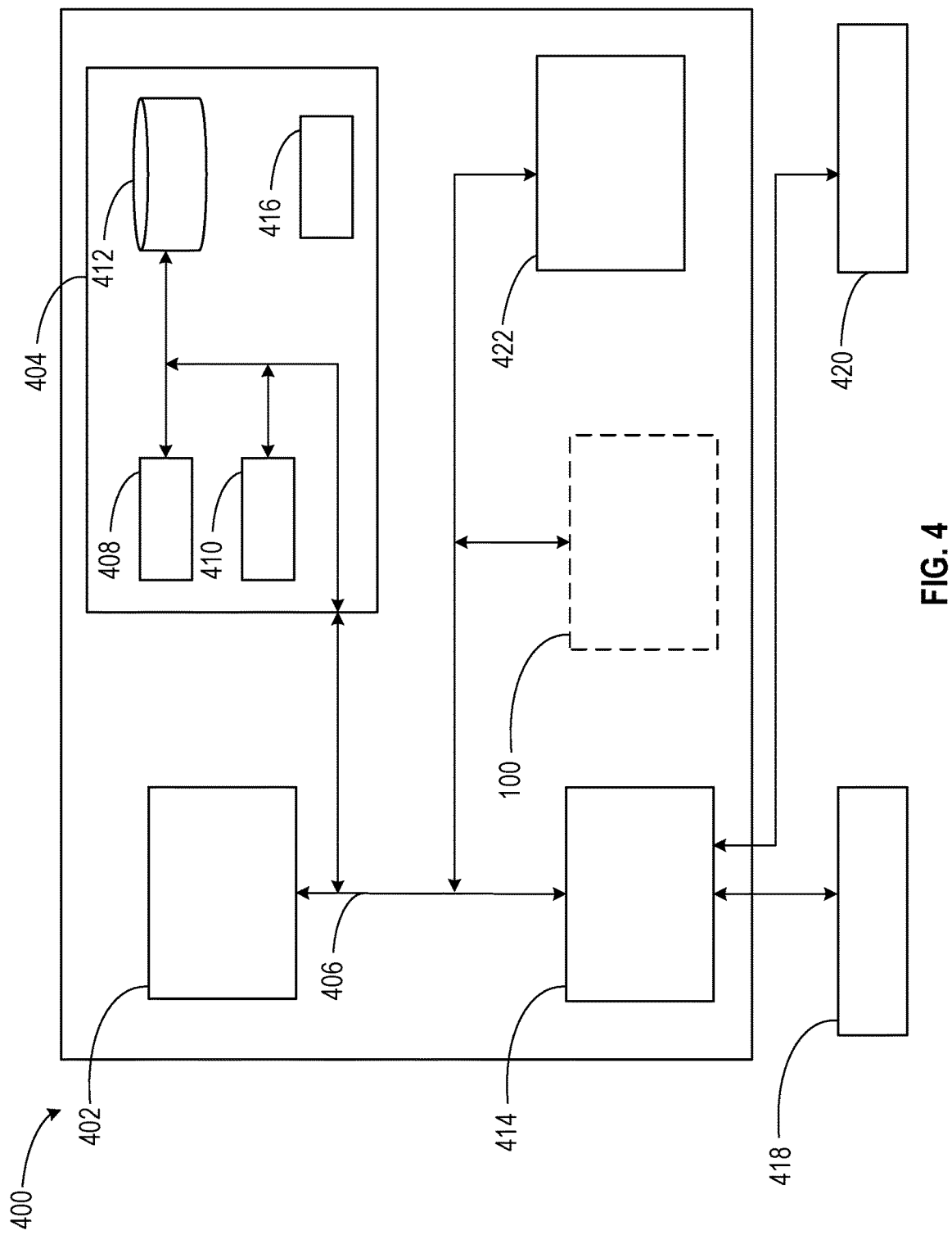
FIG. 4 depicts a block diagram of a computing system for determining and using attribute-based quasi-identifiers within record sets, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for determination of attribute-based quasi-identifiers within record sets.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network.

In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the record component 110, the identifier component 120, the attribute component 130, and the anonymizer component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414.

Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
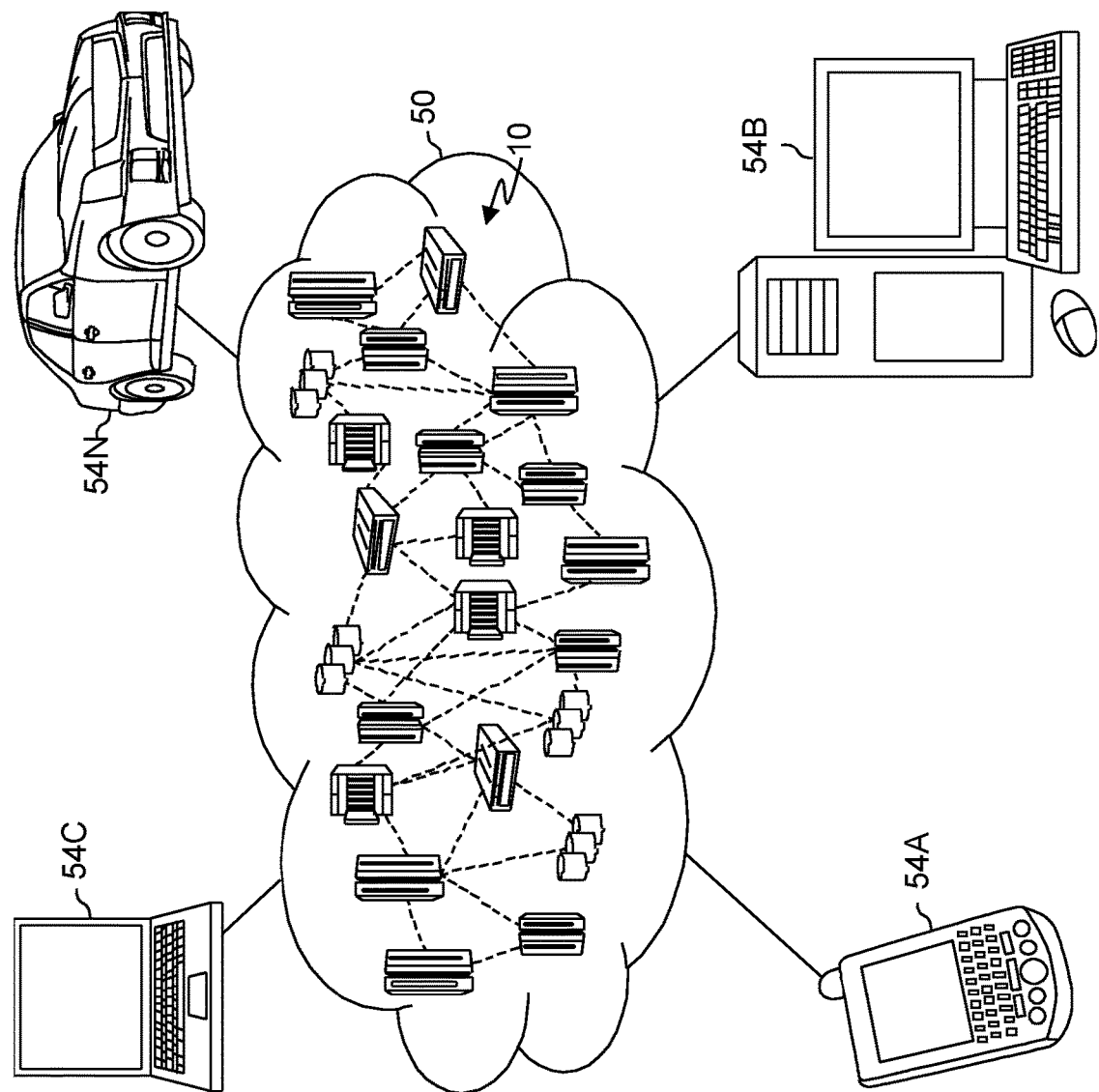
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
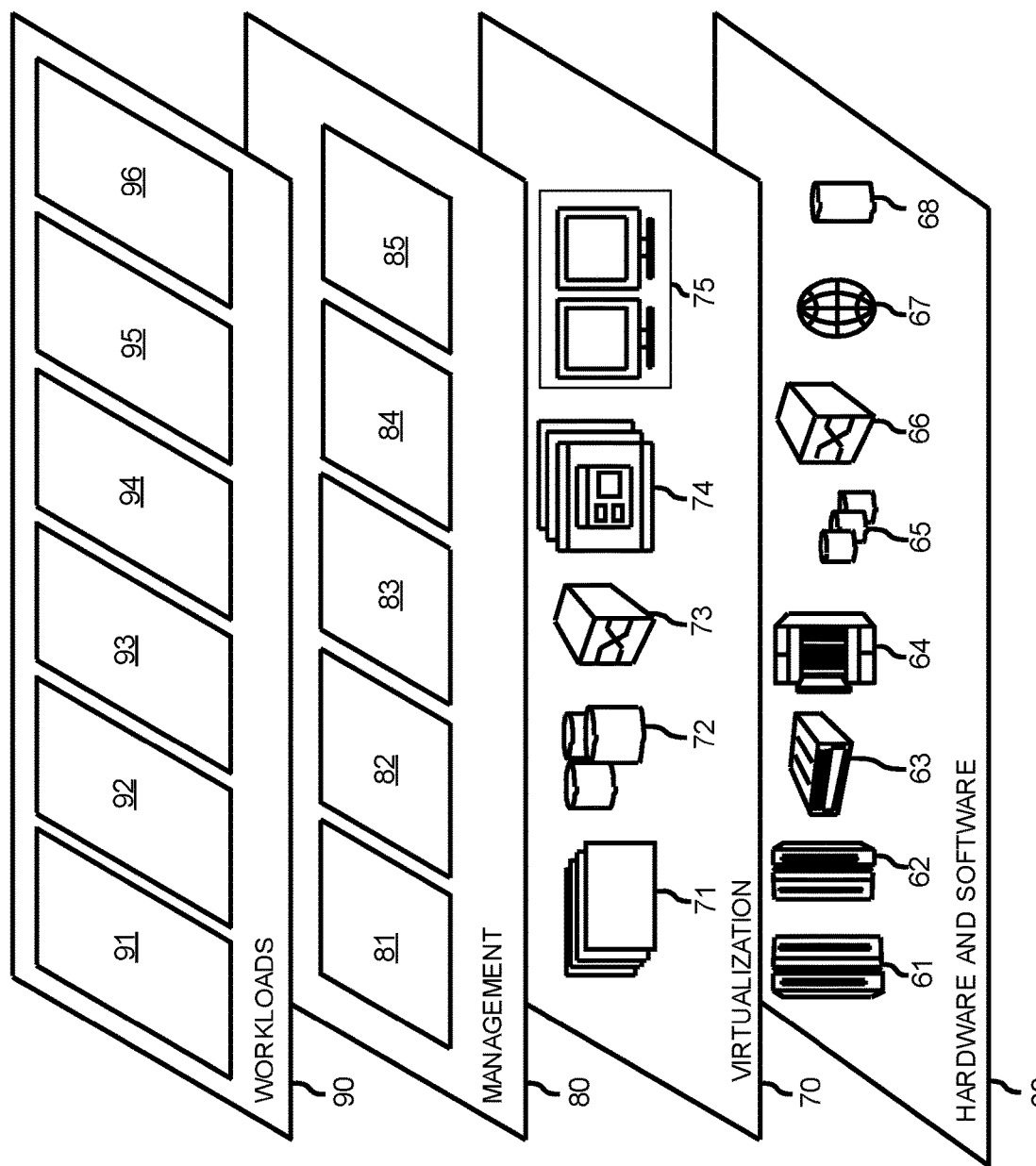
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium.

Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a first set of records containing a first set of attributes for a set of individuals, each record corresponding to at least one individual of the set of individuals;
   receiving a second set of records for the set of individuals, the second set of records containing a second set of attributes;
   accessing a first set of quasi-identifiers for the first set of records, the first set of quasi-identifiers based on the first set of attributes;
   determining a set of new attributes of the second set of attributes based on the first set of attributes, a set of direct indicators, and a set of ubiquitous attributes;
   generating a second set of quasi-identifiers based on the first set of quasi-identifiers, the set of new attributes, and attribute frequencies of the set of new attributes; and
   generating an anonymized set of records from the second set of records, the anonymized set of records generated based on the second set of quasi-identifiers.

2. The computer-implemented method of claim 1, wherein determining the set of new attributes further comprises:
   identifying one or more direct indicators within the second set of attributes; and
   removing the one or more direct indicators from the second set of attributes.

3. The computer-implemented method of claim 2, wherein determining the set of new attributes further comprises:
   identifying one or more ubiquitous attributes within the second set of attributes; and
   removing the one or more ubiquitous attributes from the second set of attributes.

4. The computer-implemented method of claim 3, wherein generating the second set of quasi-identifiers further comprises:
   determining a frequency of each attribute of the set of new attributes to generate a second set of value frequencies, each attribute of the new set of attributes being associated with a value frequency of the second set of value frequencies; and
   generating a second sorted list of the set of new attributes based on the second set of value frequencies.

5. The computer-implemented method of claim 4, wherein generating the second set of quasi-identifiers further comprises:
   determining a frequency of each attribute of the first set of attributes to generate a first set of value frequencies, each attribute of the first set of attributes being associated with a value frequency of the first set of value frequencies; and
   generating a first sorted list of the first set of attributes based on the first set of value frequencies.

6. The computer-implemented method of claim 5, wherein generating the second set of quasi-identifiers further comprises:
   determining a set of identifying combinations from the first set of attributes and the new set of attributes based on the second sorted list and the first sorted list; and
   adding a subset of identifying combinations to the first set of quasi-identifiers to generate the second set of quasi-identifiers.

7. The computer-implemented method of claim 6, wherein each identifying combination of the set of identifying combinations is a combination of attributes from at least one of the first set of attributes and the new set of attributes, and wherein each identifying combination includes a number of attributes fewer than a combination threshold.

8. A system, comprising:
   one or more processors; and
   a computer-readable storage medium, coupled to the one or more processors, storing program instructions that, when executed by the one or more processors, cause the one or more processors to perform operations comprising:
      receiving a first set of records containing a first set of attributes for a set of individuals, each record corresponding to at least one individual of the set of individuals;
      receiving a second set of records for the set of individuals, the second set of records containing a second set of attributes;
      accessing a first set of quasi-identifiers for the first set of records, the first set of quasi-identifiers based on the first set of attributes;
      determining a set of new attributes of the second set of attributes based on the first set of attributes, a set of direct indicators, and a set of ubiquitous attributes;
      generating a second set of quasi-identifiers based on the first set of quasi-identifiers, the set of new attributes, and attribute frequencies of the set of new attributes; and generating an anonymized set of records from the second set of records, the anonymized set of records generated based on the second set of quasi-identifiers.

9. The system of claim 8, wherein determining the set of new attributes further comprises:
    identifying one or more direct indicators within the second set of attributes; and
    removing the one or more direct indicators from the second set of attributes.

10. The system of claim 9, wherein determining the set of new attributes further comprises:
    identifying one or more ubiquitous attributes within the second set of attributes; and
    removing the one or more ubiquitous attributes from the second set of attributes.

11. The system of claim 10, wherein generating the second set of quasi-identifiers further comprises:
    determining a frequency of each attribute of the set of new attributes to generate a second set of value frequencies, each attribute of the new set of attributes being associated with a value frequency of the second set of value frequencies; and
    generating a second sorted list of the set of new attributes based on the second set of value frequencies.

12. The system of claim 11, wherein generating the second set of quasi-identifiers further comprises:
    determining a frequency of each attribute of the first set of attributes to generate a first set of value frequencies, each attribute of the first set of attributes being associated with a value frequency of the first set of value frequencies; and
    generating a first sorted list of the first set of attributes based on the first set of value frequencies.

13. The system of claim 12, wherein generating the second set of quasi-identifiers further comprises:
    determining a set of identifying combinations from the first set of attributes and the new set of attributes based on the second sorted list and the first sorted list; and
    adding a subset of identifying combinations to the first set of quasi-identifiers to generate the second set of quasi-identifiers.

14. The system of claim 13, wherein each identifying combination of the set of identifying combinations is a combination of attributes from at least one of the first set of attributes and the new set of attributes, and wherein each identifying combination includes a number of attributes fewer than a combination threshold.

15. A computer program product comprising a computer readable storage medium having program instructions embodied therewith, the program instructions being executable by one or more processors to cause the one or more processors to perform operations comprising:
    receiving a first set of records containing a first set of attributes for a set of individuals, each record corresponding to at least one individual of the set of individuals;
    receiving a second set of records for the set of individuals, the second set of records containing a second set of attributes;
    accessing a first set of quasi-identifiers for the first set of records, the first set of quasi-identifiers based on the first set of attributes;
    determining a set of new attributes of the second set of attributes based on the first set of attributes, a set of direct indicators, and a set of ubiquitous attributes;
    generating a second set of quasi-identifiers based on the first set of quasi-identifiers, the set of new attributes, and attribute frequencies of the set of new attributes; and
    generating an anonymized set of records from the second set of records, the anonymized set of records generated based on the second set of quasi-identifiers.

16. The computer program product of claim 15, wherein determining the set of new attributes further comprises:
    identifying one or more direct indicators within the second set of attributes; and
    removing the one or more direct indicators from the second set of attributes.

17. The computer program product of claim 16, wherein determining the set of new attributes further comprises:
    identifying one or more ubiquitous attributes within the second set of attributes; and
    removing the one or more ubiquitous attributes from the second set of attributes.

18. The computer program product of claim 17, wherein generating the second set of quasi-identifiers further comprises:
    determining a frequency of each attribute of the set of new attributes to generate a second set of value frequencies, each attribute of the new set of attributes being associated with a value frequency of the second set of value frequencies; and
    generating a second sorted list of the set of new attributes based on the second set of value frequencies.

19. The computer program product of claim 18, wherein generating the second set of quasi-identifiers further comprises:
    determining a frequency of each attribute of the first set of attributes to generate a first set of value frequencies, each attribute of the first set of attributes being associated with a value frequency of the first set of value frequencies; and
    generating a first sorted list of the first set of attributes based on the first set of value frequencies.

20. The computer program product of claim 19, wherein generating the second set of quasi-identifiers further comprises:
    determining a set of identifying combinations from the first set of attributes and the new set of attributes based on the second sorted list and the first sorted list; and
    adding a subset of identifying combinations to the first set of quasi-identifiers to generate the second set of quasi-identifiers.

* * * * *